Oct. 20, 1931.  G. F. WENNAGEL  1,828,008
TROLLEY EAR
Filed Dec. 31, 1929
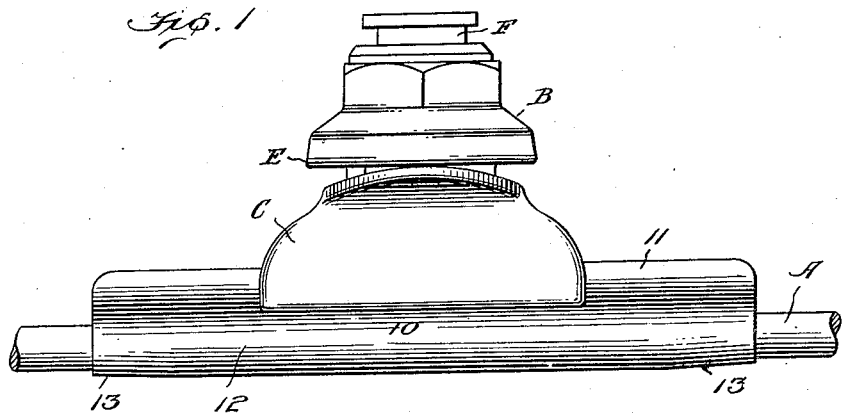
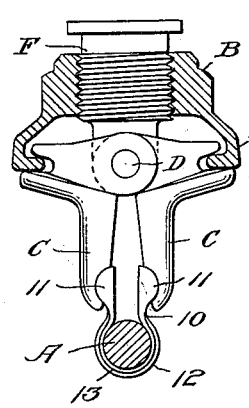
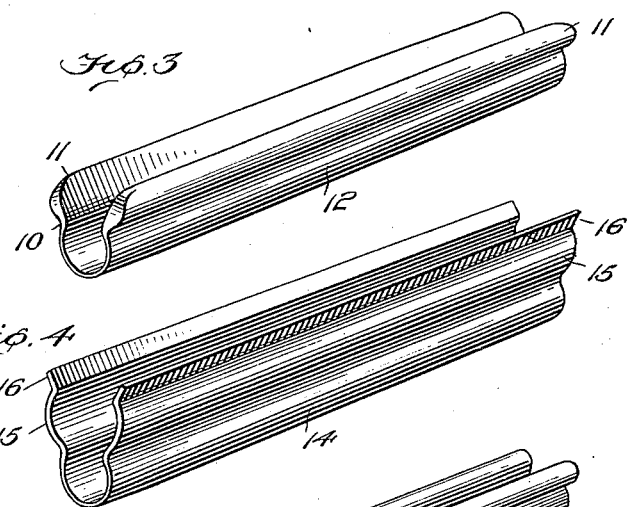
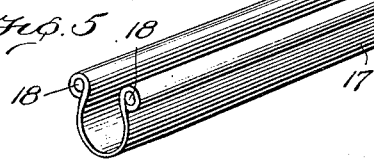
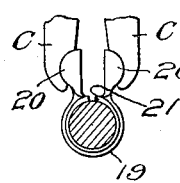
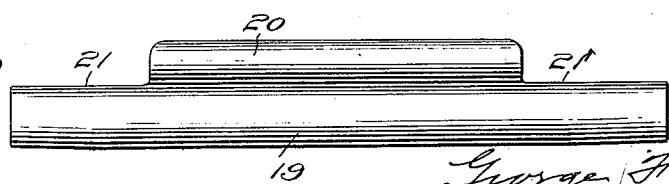
Inventor
George F. Wennagel
By Ernest J. Mechlin
his Attorney Patented Oct. 20, 1931

1,828,008

UNITED STATES PATENT OFFICE

GEORGE F. WENNAGEL, OF BALTIMORE COUNTY, MARYLAND

TROLLEY EAR

Application filed December 31, 1929. Serial No. 417,805.

The invention relates to conductor supports and has special reference to what are known as "trolley ears" used for suspending trolley wires from whatever supports are provided for the purpose.

It is well known that the usual type of trolley ear comprises an elongated metal member carried by a clamp and open at its bottom to engage upon or receive a trolley wire, the metal being peened over at the edges of the opening to retain the conductor in place and prevent it from dropping down. Numerous devices of this character are on the market and in service but all are apparently unsatisfactory for various reasons, one of which is the difficulty and time consumed in effecting installation and making replacements, another being the high initial cost and a still further one being the low junk value of ears which have been discarded as unfit for further service. The life of a trolley ear is short as it is subjected to tremendous wear, especially in populous sections, where cars are run at very frequent intervals. In localities and under traffic conditions where trolley ears must be replaced a half dozen or so times per year the expense of maintaining the trolley equipment in proper condition becomes an important item.

It is with all of the above facts in view that I have devised the present invention which has for its general object the provision of a trolley ear capable of use in connection with the usual supporting clamps and upon round trolley wires and which will give the latter all the advantageous characteristics of a trolley of figure 8 cross section with none of its drawbacks.

A very important object of the invention is to provide a trolley ear which may be applied in an extremely simple manner and which will adequately retain the conductor without it being necessary to peen over or upset any edges, a feature of importance when it is considered that replacement ears are applied with the trolley wire in place, thus necessitating doing the work in midair.

Another object of the invention is to provide a trolley ear which may be made of any desired length so as, possibly, to cover portions of a trolley wire which have become worn away, it being very well known that a trolley wire invariably wears at the ends of the ears where the trolley wheel runs off from the ears and strikes against it.

Yet another object is to provide a trolley ear which has a continuous portion extending beneath the trolley wire and which will therefore positively support the same.

A further object of the invention is to provide a trolley ear which may be formed from a strip of sheet metal of indeterminate length simply rolled to have the proper cross sectional configuration.

An additional object is to provide a trolley ear which will be very simple and inexpensive to make as well as easy to install, and also positive in action, efficient and durable in service, and a general improvement in the art.

With the above and other objects and advantages in view, the invention preferably consists in the construction, and modifications thereof, to be hereinafter more fully described and claimed, and illustrated in the accompanying drawings in which:

Figure 1 is a side elevation of a trolley ear constructed in accordance with my invention, showing it associated with a conventional type of clamp and in operative position upon a trolley wire.

Figure 2 is an end elevation of the clamp and ear,

Figure 3 is a perspective view of the ear alone, showing one specific form thereof, Figures 4 and 5 are perspective views showing modified forms of the ear, Figure 6 is a side elevation illustrating yet another modification, and Figure 7 is an end view thereof.

Referring more particularly to the drawings, the letter A designates a trolley wire of the round type and B represents a conventional type of suspension clamp which is in common use, this clamp including jaws C which are pivotally connected at D and urged into clamping engagement with a trolley ear by a ring or collar E screwed onto a threaded stem F to which the jaws are pivoted. No novelty is claimed for this suspension clamp which may be any one of several different types, the particular one illustrated being covered by U. S. Patent No. 1,461,752, granted July 17th, 1923, which patent may be referred to for specific details of the clamp if such is necessary. In so far as the present invention is concerned it is sufficient that the clamp have coacting jaws capable of gripping the ear to be described.

In carrying out all forms of my invention I provide an ear which may be constructed from a simple strip of sheet metal, preferably copper, which is rolled into any one of the cross sectional shapes to be hereinafter described and folded or bent longitudinally into substantially U-shape. There are of course numerous possible variations and several are to be described.

The ear 10 shown in Figures 1 to 3 comprises an elongated metallic member formed of sheet metal of suitable gauge rolled or otherwise treated to provide thickened beads 11 at its edges, these beads being intended to be of a shape capable of being positively gripped by the jaws of whatever suitable clamp is used. This member is folded or bent longitudinally and properly shaped to define a substantially cylindrical portion 12 to receive and engage upon the conductor A and the ends thereof are preferably slightly tapered off as indicated at 13 to make an easy approach and run-off for the trolley wheel, thereby reducing the shock upon engagement of the trolley wheel with the ear and similarly reducing the shock to the trolley wire when the wheel leaves the ear.

In the modification shown in Figure 4 the construction is essentially the same except that the thickening or reinforcing of the edges, shown at 11, is omitted. A cylindrical portion 14 is provided corresponding to the above described portion 12 and this is continued into a curved bead 15 merging into flanges 16, the bead 15 being intended and adapted to be gripped between the jaws C of the clamp, there being plenty of space between the jaws to accommodate the flanges 16.

In Figure 5 there is disclosed another variation in which there is a cylindrical conductor engaging portion 17 which has its edges simply rolled back preferably about longitudinally extending stiffening or reinforcing rods or wires 18.

In all of the above described forms of the invention it is intended that the slot or opening in the ear be of sufficient size to pass easily over the trolley wire and for this reason the sides defining the opening are represented as divergent. It is also intended that the entrance to the cylindrical portion 12, 14 or 17, as the case may be, be somewhat constricted, that is to say of slightly less diameter than that of the trolley wire so that by the application of a moderate pressure to the ear it can be snapped onto the trolley wire and will remain thereon without assistance so that the workman may have his hands free to manipulate the clamp and effect connection thereof with the ear. There is an additional feature illustrated in Figures 6 and 7 which disclose still another modification. In this form there is a cylindrical portion 19 which may be of any desired length and slightly tapered at its ends as above described and which has the intermediate portions of its sides formed with beads or ribs 20 corresponding to the ribs or thickened portions 11 shown in Figures 1 to 3. However, these ribs 20 do not extend throughout the length of the ear but are cut away as they need not be any longer than the width of the jaws in the clamp. The edges of the cut away portions may, if desired, be peened over or upset after the ear is in place on the trolley wire so as to increase the holding action, this being shown at 21.

In use, it will be seen that the ear, regardless of which form is used, may be cut to any desired length and may conform to those in common use in this respect or may be made long enough to cover badly worn spots in the trolley wire and protect the same against further wear which is of course a progressive proposition increasing rapidly after it once starts. Any one of the ears disclosed is engaged with the trolley wire and pressed thereagainst so as to cause the wire to enter the elongated cylindrical saddle portion. The mechanic may then very easily slide the ear along the trolley wire to bring it to the desired location, after which he engages the ear between the jaws of the clamp and turns down the collar or ring E of the latter to draw the ear in close and firm engagement with the trolley wire. If at any time it is deemed advisable to move the trolley wire along with respect to the supports therefor so as to bring worn spots out of proximity with the ears, this can be very readily accomplished by unscrewing the rings or collars of the different clamps so that the gripping action will be relieved, this permitting the trolley wire to be pulled through the ears. Of course the ears are subjected to considerable wear in service but when they become worn through they need not at once be discarded inasmuch as they will still possess supporting ability as the edges of the opening worn will still project beneath the curve at the sides of the trolley wire and retain it as well as the peened over edges of the ordinary type of ear. When wear has progressed to such an extent that replacement is necessary this may be accomplished very simply by unscrewing the rings or collars of the clamps, permitting the worn-out ear or pieces thereof to drop out, and then applying new ears as above described.

Another feature worthy of note is that there need be no grade of metal considered from a reclamation viewpoint. In other words there is a high junk value owing to the comparatively slight loss and the discarded ears may be saved as scrap and made up into fresh stock.

When a trolley wire is equipped with ears constructed in accordance with my invention it has the effect of being figure 8 shaped in cross section at the points where the clamps are located. An ordinary round trolley wire therefore possesses all of the advantages of one of the figure 8 cross section without the drawback of the additional cost thereof and without the objectionable feature possessed thereby that they turn sideways where there is a long span between the points of support.

From the foregoing description and a study of the drawings it will be apparent that I have thus provided a very simply constructed and consequently inexpensive trolley ear which will greatly cut down the cost of original installation of trolley systems and minimize the expense of maintenance or upkeep. It is believed that the features of importance have been stressed above and that the benefits will be readily understood by one skilled in the art without further explanation.

While I have shown and described several forms of my invention, all embodying the same general principle, it should be understood that I reserve the right to make all such changes in the details of construction as will not depart from the spirit of the invention or the scope of the claims hereunto appended.

Having thus described the invention, I claim:

1. A trolley ear comprising an elongated metallic member substantially U-shaped in cross section engageable upon a trolley wire to extend beneath the same and having its sides provided with thickened means adapted for engagement between the jaws of a suspension clamp.

2. A trolley ear comprising an elongated metallic member closed at its bottom and open at its top and adapted to be engaged beneath a trolley wire in embracing relation thereto, the edges at the open top being provided with longitudinally extending outstanding beads adapted for engagement between the jaws of a suspension clamp.

3. A trolley ear comprising an integral elongated metallic member of general U-shape in cross section and adapted for engagement upon a trolley wire to extend beneath the same and in embracing relation thereto, said member having the intermediate portions of its sides projected inwardly to define a constricted entrance to the bight portion and the edge portion of the sides being formed beyond said inwardly projected portions with outstanding projections adapted for engagement between the jaws of a suspension clamp.

4. A trolley ear comprising a metal member of general U-shape in cross section and adapted for engagement upon a trolley wire with its bight portion conformingly receiving the same, said member having the intermediate portions of its sides extended inwardly and spaced apart a distance less than the diameter of the trolley wire to which the ear is applied so as to effect snapping engagement on the wire.

5. A trolley ear comprising a metal member of general U-shape in cross section and adapted for engagement upon a trolley wire with its bight portion conformingly receiving the same, said member having the intermediate portions of its sides extended inwardly and spaced apart a distance less than the diameter of the trolley wire to which the ear is applied to effect snapping engagement upon the wire, and said sides diverging at their upper edges to guide the wire into the bight portion and being adapted for engagement between the jaws of a suspension clamp.

6. A trolley ear comprising a metal member of general U-shape in cross section and adapted for engagement upon a trolley wire with its bight portion conformingly receiving the same, said member having the intermediate portions of its sides extended inwardly and spaced apart a distance less than the diameter of the trolley wire to which the ear is applied, and said sides diverging at their upper edges and being adapted for engagement between the jaws of suspension clamp, the space between the edges of said sides being greater than the diameter of the trolley wire, said edges being formed with rolled beads.

7. A trolley ear comprising an elongated metallic member of saddle form closed at its bottom and open at its top and engageable upon a trolley wire to extend beneath the same, said member having sides formed for snapping engagement upon the trolley wire and diverging toward the open top to guide the trolley wire to its seat in the closed bottom, said sides being adapted for engagement between the jaws of a suspension clamp and having their edges thickened.

8. A trolley ear comprising an elongated metallic member of saddle form closed at its bottom and open at its top and engageable upon a trolley wire to extend beneath the same, said member having sides formed for snapping engagement upon the trolley wire and diverging toward the open top to guide the trolley wire to its seat in the closed bottom, said sides being adapted for engagement between the jaws of a suspension clamp and having edge portions of greater thickness.

9. A trolley ear comprising an elongated metallic member of saddle form closed at its bottom and open at its top and engageable upon a trolley wire to extend beneath the same, said member having sides formed for snapping engagement upon the trolley wire and diverging toward the open top to guide the trolley wire to its seat in the closed bottom, said sides being adapted for engagement between the jaws of a suspension clamp and having edge portions of greater thickness, said sides being cut away beyond the area intended to be grasped by the clamp.

10. A trolley ear comprising an elongated metallic member of saddle form closed at its bottom and open at its top and engageable upon a trolley wire to extend beneath the same, said member having sides formed for snapping engagement upon the trolley wire and diverging toward the open top to guide the trolley wire to its seat in the closed bottom, said sides being adapted for engagement between the jaws of a suspension clamp and having edge portions of greater thickness, said sides being cut away beyond the area intended to be grasped by the clamp, the material remaining at the cut away portions being adapted to have its cut edges peened over the trolley wire.

In testimony whereof I affix my signature.

GEORGE F. WENNAGEL.